US010622827B2

(12) United States Patent
Ichikawa et al.

(10) Patent No.: US 10,622,827 B2
(45) Date of Patent: *Apr. 14, 2020

(54) NON-CONTACT ELECTRIC POWER TRANSMISSION SYSTEM, CHARGING STATION, AND VEHICLE

(71) Applicant: TOYOTA JIDOSHA KABUSHIKI KAISHA, Toyota-shi, Aichi-ken (JP)

(72) Inventors: Shinji Ichikawa, Toyota (JP); Satoshi Taniguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,897

(22) Filed: Jun. 18, 2018

(65) Prior Publication Data

US 2018/0304756 A1    Oct. 25, 2018

Related U.S. Application Data

(63) Continuation of application No. 15/483,339, filed on Apr. 10, 2017, now Pat. No. 10,023,058, which is a (Continued)

(30) Foreign Application Priority Data

Jan. 31, 2014    (JP) .................................. 2014-017139

(51) Int. Cl.
*H02J 7/02*    (2016.01)
*B60L 53/65*    (2019.01)
(Continued)

(52) U.S. Cl.
CPC ............. *H02J 7/025* (2013.01); *B60L 53/12* (2019.02); *B60L 53/36* (2019.02); *B60L 53/38* (2019.02);
(Continued)

(58) Field of Classification Search
CPC .......... B60L 53/65; B60L 53/36; B60L 53/38; B60L 53/12; H02J 7/025; Y02T 10/7005;
(Continued)

(56) References Cited

U.S. PATENT DOCUMENTS 5,821,731 A * 10/1998 Kuki ....................... B60L 53/12
                                              320/108
6,421,600 B1 * 7/2002 Ross ........................ B60L 5/005
                                              701/117
(Continued)

FOREIGN PATENT DOCUMENTS

AU    2006269374 A1    1/2007
AU    2006269374 C1    1/2007
(Continued)

OTHER PUBLICATIONS

Aug. 12, 2016 Office Action Issued in U.S Appl. No. 14/582,773.
(Continued)

*Primary Examiner* — M Baye Diao
(74) *Attorney, Agent, or Firm* — Oliff PLC

(57) ABSTRACT

A charging station includes a plurality of electric power transmission portions and a power supply ECU. When a second vehicle is parked at a position where it can receive electric power from a first electric power transmission portion and when the second vehicle receives weak electric power from the first electric power transmission portion, the second vehicle transmits to the power supply ECU, an occupation signal which allows determination that the parking position corresponds to the first electric power transmission portion. When the power supply ECU receives the occupation signal of the first electric power transmission portion from the second vehicle, the power supply ECU stops transmission of weak electric power from the first
(Continued)

electric power transmission portion and guides a first vehicle to a second electric power transmission portion.

1 Claim, 7 Drawing Sheets

Related U.S. Application Data continuation of application No. 14/582,773, filed on Dec. 24, 2014, now Pat. No. 9,649,947.

(51) Int. Cl.
    *B60L 53/38*     (2019.01)
    *B60L 53/12*     (2019.01)
    *B60L 53/36*     (2019.01)

(52) U.S. Cl.
    CPC ........... *B60L 53/65* (2019.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
    CPC ... Y02T 90/14; Y02T 90/121; Y02T 10/7072; Y02T 90/12; Y02T 90/125; Y02T 90/122
    USPC .................................................. 320/108, 109
    See application file for complete search history.

(56) References Cited

U.S. PATENT DOCUMENTS

| | | | |
|---|---|---|---|
| 7,741,734 B2 | 6/2010 | Joannopoulos et al. | |
| 8,294,419 B2 | 10/2012 | Sasaki | |
| 9,186,995 B2 | 11/2015 | Ichikawa | |
| 9,283,857 B2* | 3/2016 | Shelton | B60L 53/305 |
| 9,358,940 B2* | 6/2016 | Cooper | B60R 16/037 |
| 9,446,674 B2* | 9/2016 | Halker | G08G 1/123 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0049978 A1 | 3/2011 | Sasaki et al. | |
| 2011/0193520 A1* | 8/2011 | Yamazaki | H02J 50/20 320/108 |
| 2011/0254377 A1 | 10/2011 | Wildmer et al. | |
| 2011/0285349 A1 | 11/2011 | Widmer et al. | |
| 2012/0043172 A1 | 2/2012 | Ichikawa | |
| 2012/0206098 A1* | 8/2012 | Kim | B60L 11/182 320/108 |
| 2012/0229085 A1* | 9/2012 | Lau | B60L 53/305 320/109 |
| 2012/0262002 A1 | 10/2012 | Widmer et al. | |
| 2013/0038272 A1 | 2/2013 | Sagata | |
| 2013/0127409 A1 | 5/2013 | Ichikawa | |
| 2013/0193749 A1 | 8/2013 | Nakamura et al. | |
| 2013/0200718 A1 | 8/2013 | Ogawa et al. | |
| 2014/0015328 A1* | 1/2014 | Beaver | B60L 53/12 307/104 |
| 2014/0035522 A1 | 2/2014 | Oishi | |
| 2014/0035526 A1 | 2/2014 | Tripathi et al. | |
| 2014/0285030 A1 | 9/2014 | Nakamura et al. | |
| 2014/0333256 A1 | 11/2014 | Widmer et al. | |
| 2016/0297314 A1* | 10/2016 | Iwai | H02J 7/0027 |

FOREIGN PATENT DOCUMENTS

| | | |
|---|---|---|
| AU | 2007349874 A1 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102823106 A | 12/2012 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2011-223657 A | 11/2011 |
| JP | 2012-208685 A | 10/2012 |
| JP | 2013-110822 A | 6/2013 |
| JP | 2013-126327 A | 6/2013 |
| JP | 2013-132170 A | 7/2013 |
| JP | 2013-135572 A | 7/2013 |
| JP | 2013-146148 A | 7/2013 |
| JP | 2013-146154 A | 7/2013 |
| JP | 2013-154815 A | 8/2013 |
| JP | 2013-247796 A | 12/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2012/086048 A1 | 6/2012 |
| WO | 2012/111127 A1 | 8/2012 |
| WO | 2013/061440 A1 | 5/2013 |
| WO | 2013-108108 A2 | 7/2013 |

OTHER PUBLICATIONS

U.S. Appl. No. 14/582,773, filed Dec. 24, 2014 in the name of Shinji Ichikawa et al.
Oct. 5, 2017 Office Action Issued in U.S Appl. No. 15/483,339.
Mar. 14, 2018 Notice of Allowance issued in U.S. Appl. No. 15/483,339.
Mar. 15, 2017 Notice of Allowance issued in U.S. Appl. No. 14/582,773.
U.S. Appl. No. 15/483,339, filed Apr. 10, 2017 in the name of Shinji Ichikawa et al.

* cited by examiner

NON-CONTACT ELECTRIC POWER TRANSMISSION SYSTEM, CHARGING STATION, AND VEHICLE

This application is a continuation of U.S. application Ser. No. 15/483,339 filed. Apr. 10, 2017, which is a continuation of U.S. application Ser. No. 14/582,773 filed Dec. 24, 2014, which is based on and claims priority under 35 U.S.C. 119 from Japanese Patent Application No. 2014-017139 filed on Jan. 31, 2014, the entire contents of which are hereby incorporated by reference.

BACKGROUND OF THE INVENTION

Field of the Invention

The present invention relates to a non-contact electric power transmission system, a charging station, and a vehicle.

Description of the Background Art

Japanese Patent Laying-Open No. 2013-135572 discloses a non-contact charging system in which electric power is transmitted from a vehicle to a charging station in a non-contact manner. In the non-contact charging system, positioning between an electric power transmission portion of the charging station and an electric power reception portion of the vehicle is carried out in order to enhance efficiency in electric power transmission and reception.

In the publication above, one control unit on an electric power transmission side is provided in a charging station and this control unit on the electric power transmission side controls one electric power transmission portion (an electric power transmission coil).

Such a type that one control unit controls a plurality of electric power transmission portions, however, is possible as a type of the charging station.

Here, in such a situation that vehicles are parked at some electric power transmission portions of a plurality of electric power transmission portions, it is possible that a new vehicle enters the charging station for charging. When the electric power transmission portions are supplying electric power to already stopped vehicles, the charging station can determine that the vehicles are present at those electric power transmission portions. On the other hand, it is also possible that in spite of completion of charging of the vehicles, the vehicles remain stopped over the electric power transmission portions without moving. In such a state, the charging station cannot know whether or not the vehicles remain stopped at the electric power transmission portions.

Consequently, the charging station cannot determine to which electric power transmission portion a vehicle which has newly entered the charging station should be guided.

If a sensor for checking a position of a vehicle is to be provided for each parking frame, cost for installation of a charging station increases and construction also requires efforts.

SUMMARY OF THE INVENTION

An object of the present invention is to provide a non-contact electric power transmission system which can guide a vehicle which has newly arrived at a charging station to an empty electric power transmission portion, a charging station, and a vehicle.

In summary, this invention is directed to a non-contact electric power transmission system including first and second vehicles and a charging station. The charging station includes a plurality of electric power transmission portions which can transmit electric power to the vehicles in a non-contact manner and an electric power transmission control unit controlling electric power transmission from the plurality of electric power transmission portions. The electric power transmission control unit has a first electric power transmission portion, which is not transmitting electric power, of the plurality of electric power transmission portions transmit weak electric power when the electric power transmission control unit receives a signal requesting electric power transmission from the first vehicle. The second vehicle transmits to the electric power transmission control unit, an occupation signal which allows determination that a parking position corresponds to the first electric power transmission portion when the second vehicle is parked at a position where the second vehicle can receive electric power from the first electric power transmission portion and when the second vehicle receives weak electric power from the first electric power transmission portion. The electric power transmission control unit guides the first vehicle to an electric power transmission portion other than the first electric power transmission portion when the electric power transmission control unit receives the occupation signal from the second vehicle.

According to the configuration above, for example, even when the second vehicle remains stopped without moving after charging by the first electric power transmission portion, the charging station is notified of the fact that the second vehicle is occupying the first electric power transmission portion. Therefore, the charging station can guide the first vehicle, which has sent a signal requesting electric power transmission, to an electric power transmission portion other than the first electric power transmission portion.

Preferably, the electric power transmission control unit allows electric power transmission with electric power characteristics of weak electric power from the plurality of electric power transmission portions being differed for each electric power transmission portion, and the second vehicle transmits to the electric power transmission control unit, the occupation signal in accordance with the electric power characteristics of received weak electric power.

With such a configuration, the second vehicle can know based on electric power characteristics of the received weak electric power, what kind of electric power transmission portion the electric power transmission portion where the second vehicle is stopped is. Then, the second vehicle can return information which allows determination of an electric power transmission portion to the charging station.

More preferably, the electric power characteristics differed for each electric power transmission portion are a time period for supply of the weak electric power, and the second vehicle transmits a signal indicating the time period for supply as the occupation signal.

More preferably, the electric power characteristics differed for each electric power transmission portion are the number of times of switching between on and off of the weak electric power, and the second vehicle transmits a signal indicating the number of times of switching as the occupation signal.

Preferably, the second vehicle holds information indicating that the electric power transmission portion used for charging is the first electric power transmission portion of the plurality of electric power transmission portions, also after end of charging. The second vehicle transmits the occupation signal based on the held information when the second vehicle receives the weak electric power while the second vehicle is parked at the position corresponding to the first electric power transmission portion after end of charging.

According to the configuration above, without such processing as differing electric power characteristics for each electric power transmission portion at the time of transmission of weak electric power, the second vehicle can transmit an occupation signal.

Preferably, the second vehicle includes an electric power reception device which can receive electric power from any of the plurality of electric power transmission portions, a power storage device, a charging relay provided between the electric power reception device and the power storage device, a distance sensing portion, and an electric power reception control unit controlling the charging relay and the distance sensing portion. The distance sensing portion has a resistor and a distance sensing relay with which the resistor is connected between a pair of output lines of the electric power reception device. The electric power reception control unit renders the charging relay conductive and renders the distance sensing relay non-conductive when the power storage device is charged, and renders the charging relay non-conductive and renders the distance sensing relay conductive after charging of the power storage device is completed.

With the configuration above, reception of weak electric power by the vehicle can be separate from charging of the power storage device and a distance can suitably be sensed based on a received voltage generated by the weak electric power.

In another aspect, this invention is directed to a charging station which can transmit electric power to first and second vehicles in a non-contact manner, and the charging station includes a plurality of electric power transmission portions which can transmit electric power to the vehicles in a non-contact manner and an electric power transmission control unit controlling electric power transmission from the plurality of electric power transmission portions. The electric power transmission control unit has a first electric power transmission portion which is not transmitting electric power of the plurality of electric power transmission portions transmit weak electric power when the electric power transmission control unit receives a signal requesting electric power transmission from the first vehicle. The second vehicle transmits to the electric power transmission control unit, an occupation signal which allows determination that a parking position corresponds to the first electric power transmission portion when the second vehicle is parked at a position where the second vehicle can receive electric power from the first electric power transmission portion and when the second vehicle receives weak electric power from the first electric power transmission portion. The electric power transmission control unit guides the first vehicle to an electric power transmission portion other than the first electric power transmission portion when the electric power transmission control unit receives the occupation signal from the second vehicle.

According to the configuration above, for example, even when the second vehicle remains stopped without moving after charging by the first electric power transmission portion, the charging station is notified of the fact that the second vehicle is occupying the first electric power transmission portion. Therefore, the charging station can guide the first vehicle, which has sent a signal requesting electric power transmission, to an electric power transmission portion other than the first electric power transmission portion.

In another aspect, this invention is directed to a vehicle including an electric power reception device which can receive electric power from a charging station in a non-contact manner, a power storage device, a charging relay provided between the electric power reception device and the power storage device, a distance sensing portion, and an electric power reception control unit controlling the charging relay and the distance sensing portion. The distance sensing portion has a resistor and a distance sensing relay with which the resistor is connected between a pair of output lines of the electric power reception device. The electric power reception control unit renders the charging relay conductive and renders the distance sensing relay non-conductive when the power storage device is charged, and renders the charging relay non-conductive and renders the distance sensing relay conductive after charging of the power storage device is completed.

With the configuration above, reception of weak electric power by the vehicle can be separate from charging of the power storage device and a distance can suitably be sensed based on a received voltage generated by the weak electric power.

According to the present invention, a vehicle which has newly arrived at a charging station can be guided to an empty electric power transmission portion, with an electric power transmission portion where another vehicle has already parked being avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
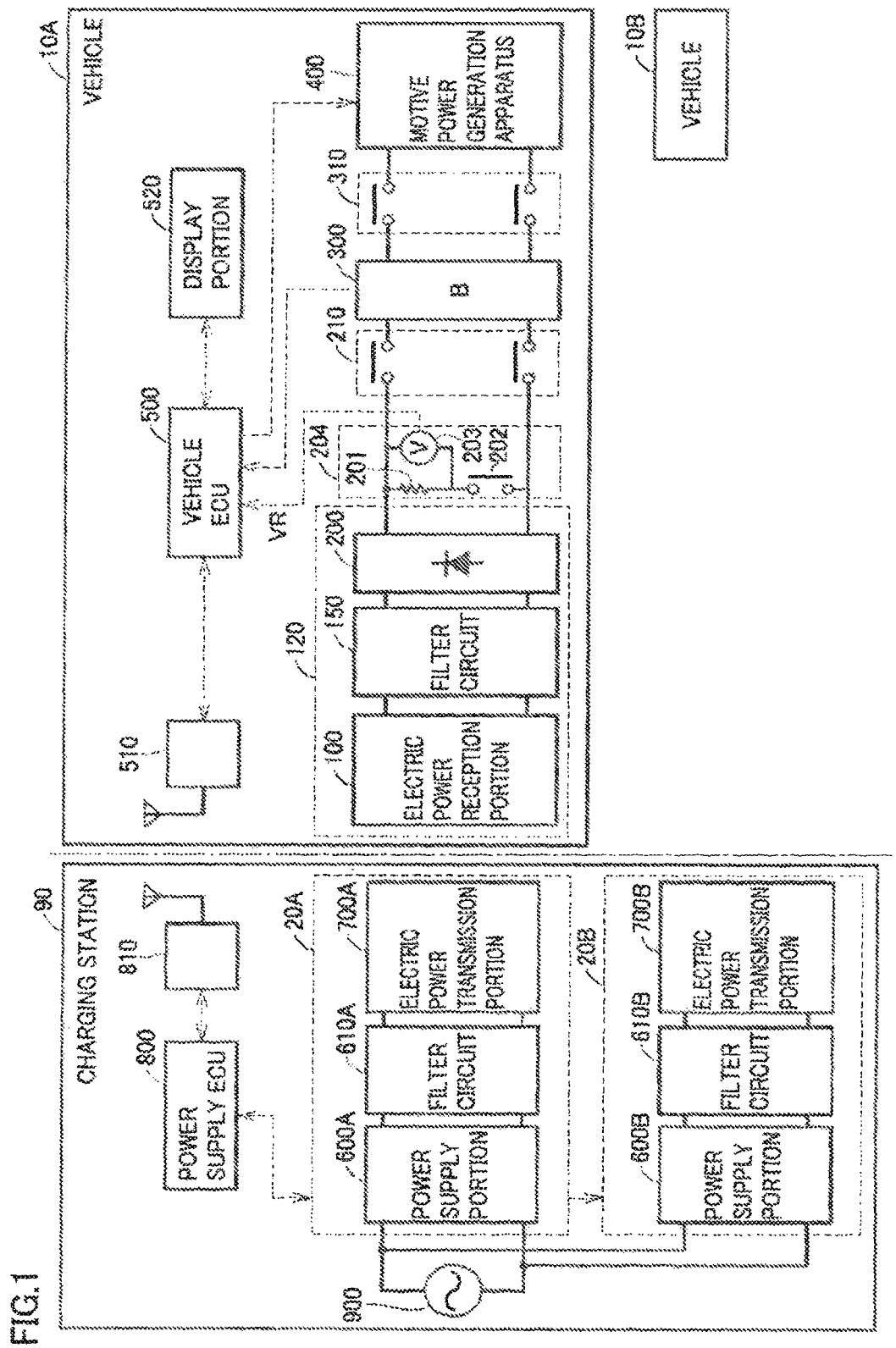
FIG. 1 is an overall configuration diagram of a non-contact electric power transmission system representing one example of an embodiment of the present invention.

An embodiment of the present invention will be described hereinafter in detail with reference to the drawings. The same or corresponding elements in the drawings have the same reference characters allotted and description thereof will not be repeated.

(Description of Overview of Non-Contact Electric Power Transmission System)

Figure 2:
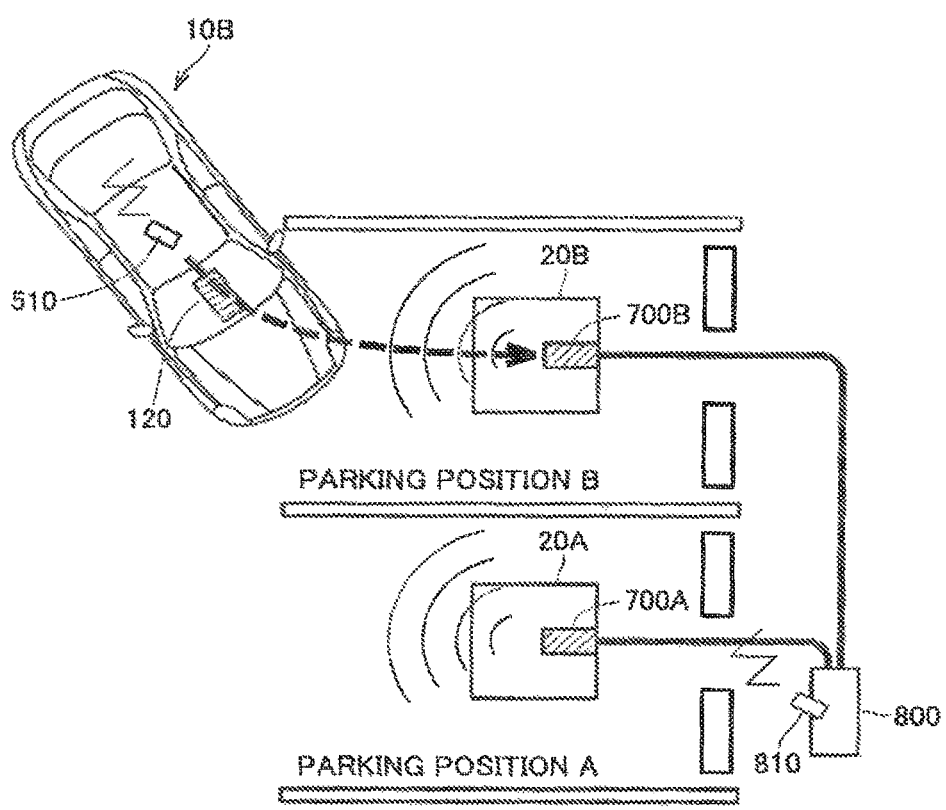
FIG. 2 is a diagram for illustrating parking of a (first) vehicle at a parking position within a charging station.
Figure 3:
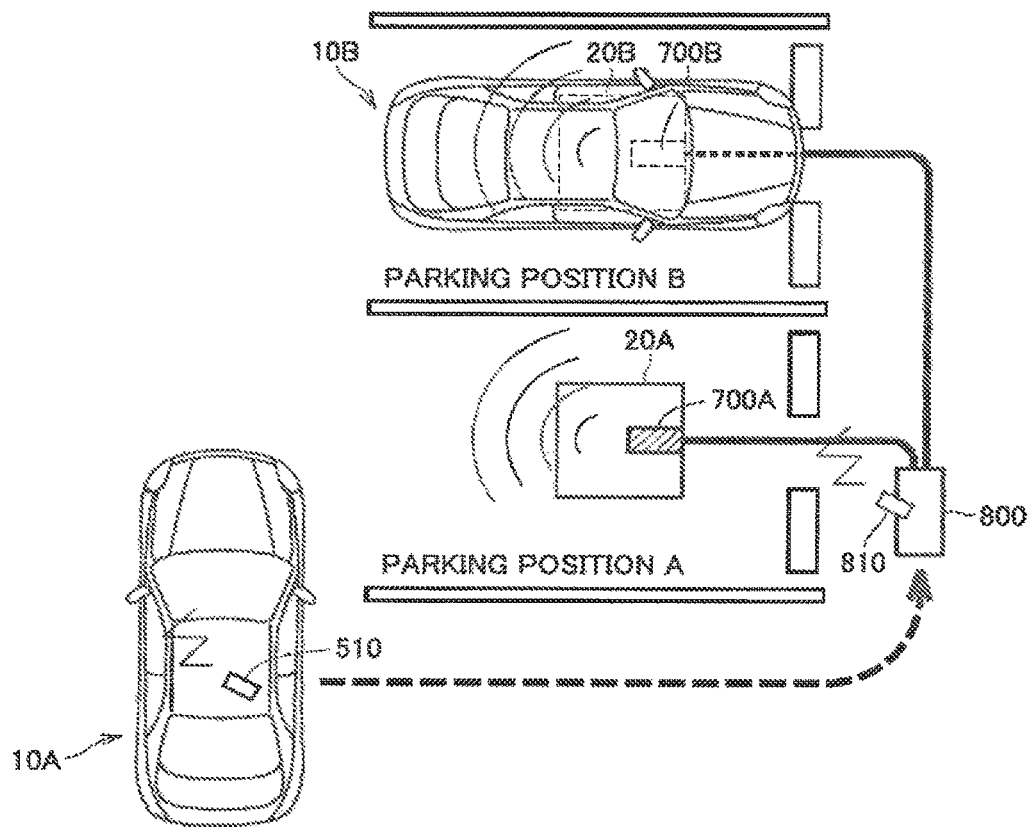
FIG. 3 is a diagram for illustrating parking of a (second) vehicle at a parking position within the charging station.

FIG. 1 is an overall configuration diagram of a non-contact electric power transmission system representing one example of an embodiment of the present invention. FIGS. 2 and 3 are diagrams for illustrating parking of vehicles at parking positions within a charging station. Initially, overview of the present embodiment will be described with reference to FIGS. 1 to 3.

Referring to FIG. 1, a non-contact electric power transmission system in the present embodiment includes vehicles 10A and 10B and a charging station 90. Charging station 90 includes a plurality of electric power transmission portions 700A and 700B which can transmit electric power to the vehicles in a non-contact manner and an electric power transmission control unit (a power supply ECU 800) controlling electric power transmission from the plurality of electric power transmission portions 700A and 700B.

As shown in FIG. 2, a case that vehicle 10B which has arrived earlier is parked over electric power transmission portion 700B for charging is considered. Vehicle 10B uses weak electric power from electric power transmission portion 700B as a test signal for positioning. To that end, vehicle 10B transmits a signal for requesting electric power transmission to the charging station. When the charging station receives the signal for requesting electric power transmission, it has an electric power transmission portion which is not transmitting electric power of the plurality of electric power transmission portions 700A and 700B transmit weak electric power. In the case of FIG. 2, a vehicle has been parked at neither of the plurality of electric power transmission portions 700A and 7001 and neither of electric power transmission portions 700A and 700B has been transmitting electric power. Therefore, both of electric power transmission portions 700A and 700B transmit weak electric power. Vehicle 10B selects electric power transmission portion 700B, and as vehicle 10B approaches electric power transmission portion 700B, an electric power reception portion 100 starts to detect weak electric power. Therefore, positioning is carried out based on intensity of weak electric power (a received voltage VR).

Here, as shown in FIG. 3, a case that vehicle 10B has not yet moved from electric power transmission portion 700B in spite of completion of charging of vehicle 10B is considered. As shown in FIG. 3, power supply ECU 800 has an electric power transmission portion which is not transmitting electric power of the plurality of electric power transmission portions 700A and 700B transmit weak electric power when power supply ECU 800 receives a signal requesting electric power transmission from vehicle 10A. For example, when charging of vehicle 10B by electric power transmission portion 700B has been completed, both of the plurality of electric power transmission portions 700A and 700B transmit weak electric power.

When vehicle 10B is parked at a position where it can receive electric power from electric power transmission portion 700B and when vehicle 10B receives weak electric power from electric power transmission portion 700B, vehicle 10B transmits to power supply ECU 800, an occupation signal which allows determination that the parking position corresponds to electric power transmission portion 700B. Transmission is carried out through a communication portion 510 and a communication portion 810 in FIG. 1. Power supply ECU 800 stops transmission of weak electric power from electric power transmission portion 700a when it receives the occupation signal of electric power transmission portion 700B from vehicle 10B, and guides vehicle 10A to an electric power transmission portion other than electric power transmission portion 700B, that is, to electric power transmission portion 700A in the case of FIG. 3.

With the configuration above, for example, even when vehicle 10B remains stopped without moving after charging by electric power transmission portion 700B, charging station 90 is notified of the fact that vehicle 10B is occupying electric power transmission portion 700B. Therefore, charging station 90 can guide vehicle 10A, which has sent a signal requesting electric power transmission, to an electric power transmission portion other than electric power transmission portion 700B (electric power transmission portion 700A in FIG. 3).

Preferably, power supply ECU 800 allows electric power transmission with electric power characteristics of weak electric power from the plurality of electric power transmission portions 700A and 700B being differed for each electric power transmission portion. Vehicle 10B transmits to power supply ECU 800, an occupation signal of electric power transmission portion 700B in accordance with electric power characteristics of received weak electric power.

According to such a configuration, vehicle 10B can know based on electric power characteristics of the received weak electric power, what kind of electric power transmission portion the electric power transmission portion where vehicle 10B is stopped is. Then, vehicle 10B can return information which allows determination of an electric power transmission portion to charging station 90.

More preferably, electric power characteristics differed for each electric power transmission portion are a time period for supply (TA, TB in FIG. 6) of weak electric power, and vehicle 10B transmits a signal indicating a time period for supply (TB in FIG. 6) as an occupation signal of electric power transmission portion 700B.

More preferably, electric power characteristics differed for each electric power transmission portion are the number of times of switching between on and off of weak electric power (sec FIG. 7), and vehicle 10B transmits a signal indicating the number of switching as an occupation signal of electric power transmission portion 700B.

Without electric power transmission with characteristics of weak electric power being differed for each electric power transmission portion, if vehicle 10B holds, also after end of charging, information at the time when pairing of vehicle 10B is carried out before charging to determine an electric power transmission portion, information allowing determination of the electric power transmission portion in response to transmission of the same weak electric power by all electric power transmission portions or reception of communication from communication portion 810 may be returned to charging station 90.

Namely, preferably, vehicle 10B is configured to hold information indicating that an electric power transmission portion used for charging is electric power transmission portion 700B of the plurality of electric power transmission portions, also after end of charging. Then, when vehicle 10B receives weak electric power while it is parked at a position corresponding to electric power transmission portion 700B (a parking position B in FIG. 2) after end of charging, vehicle 10B transmits an occupation signal based on the held information.

Preferably, each of vehicles 10A and 10B includes an electric power reception device 120 which can receive electric power from any of the plurality of electric power transmission portions, a power storage device 300, a charging relay 210 provided between electric power reception device 120 and power storage device 300, a distance sensing portion 204, and an electric power reception control unit (a vehicle ECU 500) controlling charging relay 210 and distance sensing portion 204. Distance sensing portion 204 has a resistor 201 and a distance sensing relay 202 with which resistor 201 is connected between a pair of output lines of electric power reception device 120. Vehicle ECU 500 renders charging relay 210 conductive and renders distance sensing relay 202 non-conductive when power storage device 300 is charged, and renders charging relay 210 non-conductive and renders distance sensing relay 202 conductive after completion of charging of power storage device 300.

According to the configuration above, reception of weak electric power by a vehicle can be separate from charging of power storage device 300, and a distance can suitably be sensed based on received voltage VR generated by weak electric power.

Details of each feature in the non-contact electric power transmission system will now further be described.

(Detailed Configuration of Non-Contact Electric Power Transmission System)

Referring to FIG. 1, the non-contact electric power transmission system in the present embodiment is constituted of vehicles 10A and 10B on which electric power reception device 120 configured to be able to receive electric power in a non-contact manner is mounted and charging station 90 including electric power transmission devices 20A and 20B transmitting electric power from the outside of the vehicle to electric power reception portion 100.

Vehicle 10A includes electric power reception device 120, power storage device 300, a motive power generation apparatus 400, communication portion 510, vehicle ECU 500, and a display portion 520. Electric power reception device 120 includes electric power reception portion 100, a filter circuit 150, and a rectification portion 200. Vehicle 10B is also configured similarly to vehicle 10A, although the inside is not illustrated.

Charging station 90 includes an external power supply 900, electric power transmission devices 20A and 20B, communication portion 810, and power supply ECU 800. Electric power transmission devices 20A and 20B include power supply portions 600A and 600B, filter circuits 610A and 610B, and electric power transmission portions 700A and 700B, respectively.

For example, as shown in FIG. 2, electric power transmission devices 20A and 20B are provided on or in the ground at parking positions A and B, respectively, and electric power reception device 120 is arranged in a lower portion of a vehicle body. A location of arrangement of electric power reception device 120 is not limited as such. For example, when electric power transmission devices 20A and 20B are provided above or lateral to vehicle 10, electric power reception device 120 may be provided in an upper portion of the vehicle body or in a peripheral surface (a front surface, a rear surface, and a side surface) of the vehicle body.

Electric power reception portion 100 includes a secondary coil for receiving in a non-contact manner, (AC) electric power output from any of electric power transmission portions 700A and 700B of electric power transmission devices 20A and 20B. Electric power reception portion 100 outputs received electric power to rectification portion 200. Rectification portion 200 rectifies AC power received by electric power reception portion 100 and outputs the AC power to power storage device 300. Filter circuit 150 is provided between electric power reception portion 100 and rectification portion 200 and suppresses harmonic noise generated during electric power reception from any of electric power transmission portions 700A and 700B. Filter circuit 150 is formed, for example, from an LC filter including an inductor and a capacitor.

Power storage device 300 is a rechargeable DC power supply and it is implemented, for example, by such a secondary battery as a lithium ion battery or a nickel metal hydride battery. A voltage of power storage device 300 is, for example, around 200 V. Power storage device 300 stores not only electric power output form rectification portion 200 but also electric power generated by motive power generation apparatus 400. Then, power storage device 300 supplies the stored electric power to motive power generation apparatus 400. A large-capacity capacitor can also be adopted as power storage device 300. Though not particularly illustrated, a DC-DC converter regulating an output voltage from rectification portion 200 may be provided between rectification portion 200 and power storage device 300.

Motive power generation apparatus 400 generates driving force for running of vehicle 10A by using electric power stored in power storage device 300. Though not particularly illustrated, motive power generation apparatus 400 includes, for example, an inverter receiving electric power from power storage device 300, a motor driven by the inverter, and drive wheels driven by the motor. Motive power generation apparatus 400 may include a generator for charging power storage device 300 and an engine which can drive the generator.

Vehicle ECU 500 includes a central processing unit (CPU), a storage device, and an input/output buffer (none of which is shown), receives input of signals from various sensors and outputs control signals to each device, and controls each device in vehicle 10A. By way of example, vehicle ECU 500 controls running of vehicle 10A and charging of power storage device 300. Such control is not limited to processing by software and processing with dedicated hardware (electronic circuitry) can also be performed.

Relay 210 is provided between rectification portion 200 and power storage device 300. Relay 210 is turned on by vehicle ECU 500 during charging of power storage device 300 by electric power transmission devices 20A and 20B. A system main relay (SMR) 310 is provided between power storage device 300 and motive power generation apparatus 400. SMR 310 is turned on by vehicle ECU 500 when start-up of motive power generation apparatus 400 is requested.

Relay 202 is provided between rectification portion 200 and relay 210. A voltage VR across opposing ends of resistor 201 connected in series with relay 202 is detected by a voltage sensor 203, and sent to vehicle ECU 500.

Vehicle ECU 500 communicates with communication portion 810 of charging station 90 through communication portion 510 during charging of power storage device 300 by electric power transmission devices 20A and 20B, and exchanges with power supply ECU 800, information on start/stop of charging or an electric power reception condition of vehicle 10A.

Referring to FIGS. 1 and 2, vehicle 10A or charging station 90 determines whether or not the secondary coil within electric power reception device 120 is positioned with respect to a primary coil within electric power transmission device 20A based on a not-shown car-mounted camera or on intensity of received electric power during test electric power transmission (transmission of weak electric power) by electric power transmission portion 700A, and a user is notified of a result through display portion 520. The user moves vehicle 10A such that positional relation between electric power reception device 120 and electric power transmission device 20A is good for electric power transmission and reception based on information obtained from display portion 520. The user does not necessarily have to operate a steering wheel or an accelerator, and vehicle 10A may automatically move for positioning while the user monitors such an operation on display portion 520.

In test electric power transmission with weak electric power, output to such an extent as being used in what is called a specified low power radio station (equal to or lower than 1/100 of full-scale electric power transmission used for charging) is preferred.

Referring again to FIG. 1, power supply portions 600A and 600B receive electric power from external power supply 900 such as a commercial system power supply and generate AC power having a prescribed transmission frequency.

Electric power transmission portions 700A and 700B each include a primary coil for non-contact electric power transmission to electric power reception portion 100. Electric power transmission portions 700A and 700B each receive AC power having a transmission frequency from power supply portions 600A and 600B and transmits electric power to electric power reception portion 100 of vehicle 10A in a non-contact manner through electromagnetic field generated around electric power transmission portions 700A and 700B.

Filter circuits 610A and 610B are provided between power supply portions 600A and 600B and electric power transmission portions 700A and 700B, respectively, and suppress harmonic noise generated from power supply portions 600A and 600B. Filter circuits 610A and 610B are each formed from an LC filter including an inductor and a capacitor.

Power supply ECU 800 includes a CPU, a storage device, and an input/output buffer (none of which is shown), receives input of signals from various sensors and outputs control signals to each device, and controls each device in charging station 90. By way of example, power supply ECU 800 controls switching of power supply portions 600A and 600B such that power supply portions 600A and 600B generate AC power having a transmission frequency. Such control is not limited to processing by software and processing with dedicated hardware (electronic circuitry) can also be performed.

Power supply ECU 800 communicates with communication portion 510 of vehicle 10A through communication portion 810 during electric power transmission to vehicle 10A, and exchanges with vehicle 10A, information on start/stop of charging or an electric power reception condition of vehicle 10A.

AC power having a prescribed transmission frequency is supplied from power supply portions 600A and 600B to electric power transmission portions 700A and 700B through filter circuits 610A and 610B. Each of electric power transmission portions 700A and 700B and electric power reception portion 100 of vehicle 10A includes a coil and a capacitor, and is designed to resonate at the transmission frequency. A Q value representing resonance intensity of electric power transmission portions 700A and 700B and electric power reception portion 100 is preferably 100 or higher.

When AC power is supplied from power supply portions 600A and 600B to electric power transmission portions 700A and 700B through filter circuits 610A and 610B, energy (electric power) is transferred from any of electric power transmission portions 700A and 700B to electric power reception portion 100 through electromagnetic field formed between the primary coil included in any of electric power transmission portions 700A and 700B and the secondary coil of electric power reception portion 100. Then, energy (electric power) transferred to electric power reception portion 100 is supplied to power storage device 300 through filter circuit 150 and rectification portion 200.

Though not particularly illustrated, in electric power transmission devices 20A and 20B, an insulating transformer may be provided between electric power transmission portions 700A and 700B and power supply portions 600A and 600B (for example, between electric power transmission portions 700A and 700B and filter circuits 610A and 610B). In vehicle 10A as well, an insulating transformer may be provided between electric power reception portion 100 and rectification portion 200 (for example, between electric power reception portion 100 and filter circuit 150).

(Procedure of Non-Contact Electric Power Transmission)

Figure 4:
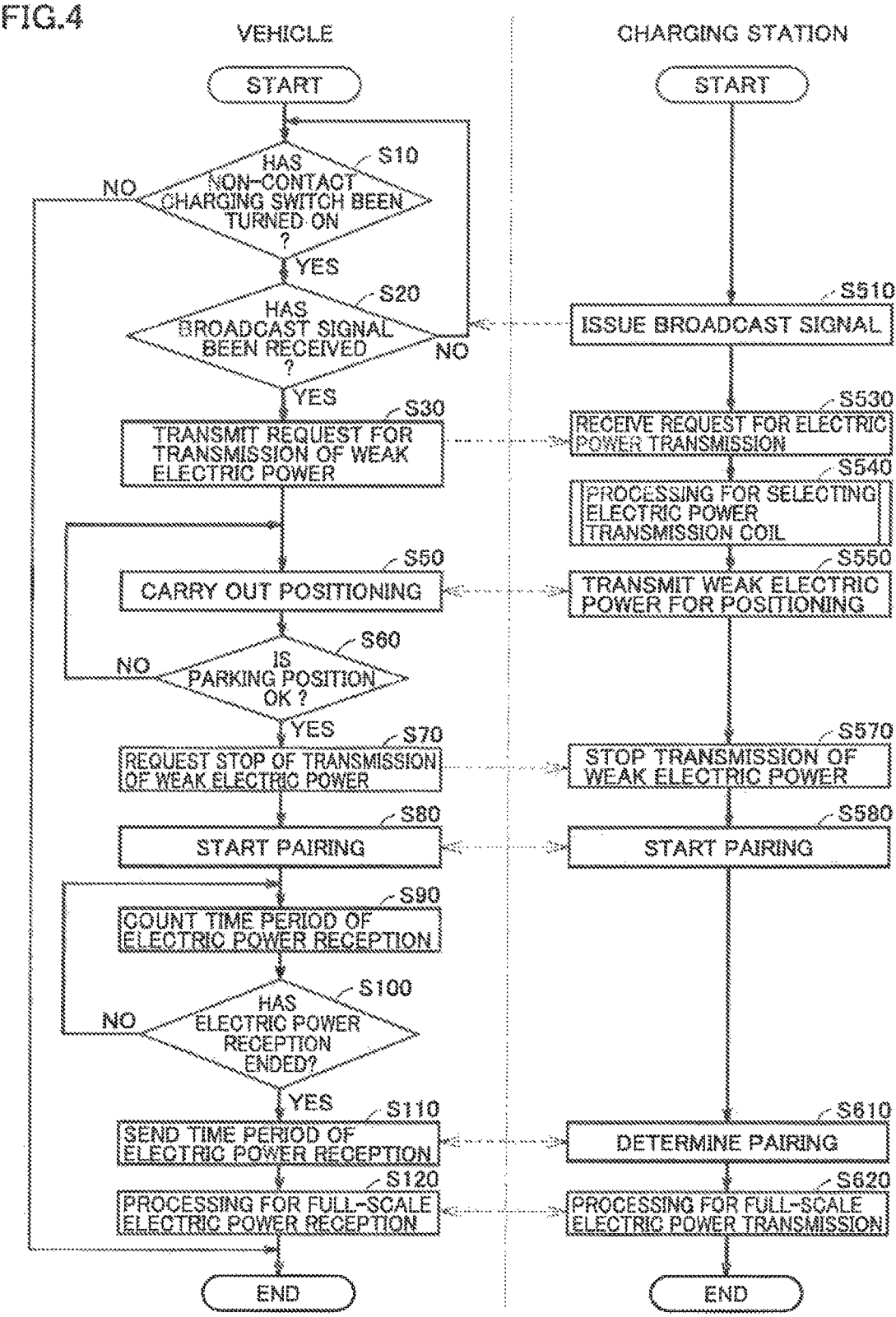
FIG. 4 is a flowchart for illustrating overview of processing performed by vehicle 10A or 10B and a charging station 90 in non-contact electric power transmission.

FIG. 4 is a flowchart for illustrating overview of processing performed by vehicle 10A or 10B and charging station 90 in non-contact electric power transmission.

Referring to FIGS. 1 and 4, in the vehicle, whether or not a non-contact charging switch designating whether or not to carry out non-contact charging is ON is determined in step S10. Though not particularly limited, preferably, the non-contact charging switch has automatically been set to ON while the vehicle is started up and the vehicle is configured such that the user can switch setting to OFF.

In step S510, power supply ECU 800 of charging station 90 broadcasts a signal notifying that a situation allows charging when there is an empty parking position.

When vehicle ECU 500 of vehicle 10A receives this signal in step S20, the process proceeds to step S30, and vehicle ECU 500 transmits a request for transmission of weak electric power to charging station 90.

In step S530, power supply ECU 800 of charging station 90 receives the request for electric power transmission.

When charging station 90 receives in step S530 the request for electric power transmission from the vehicle, in response thereto, the charging station performs processing for selecting an electric power transmission coil in step S540.

Figure 5:
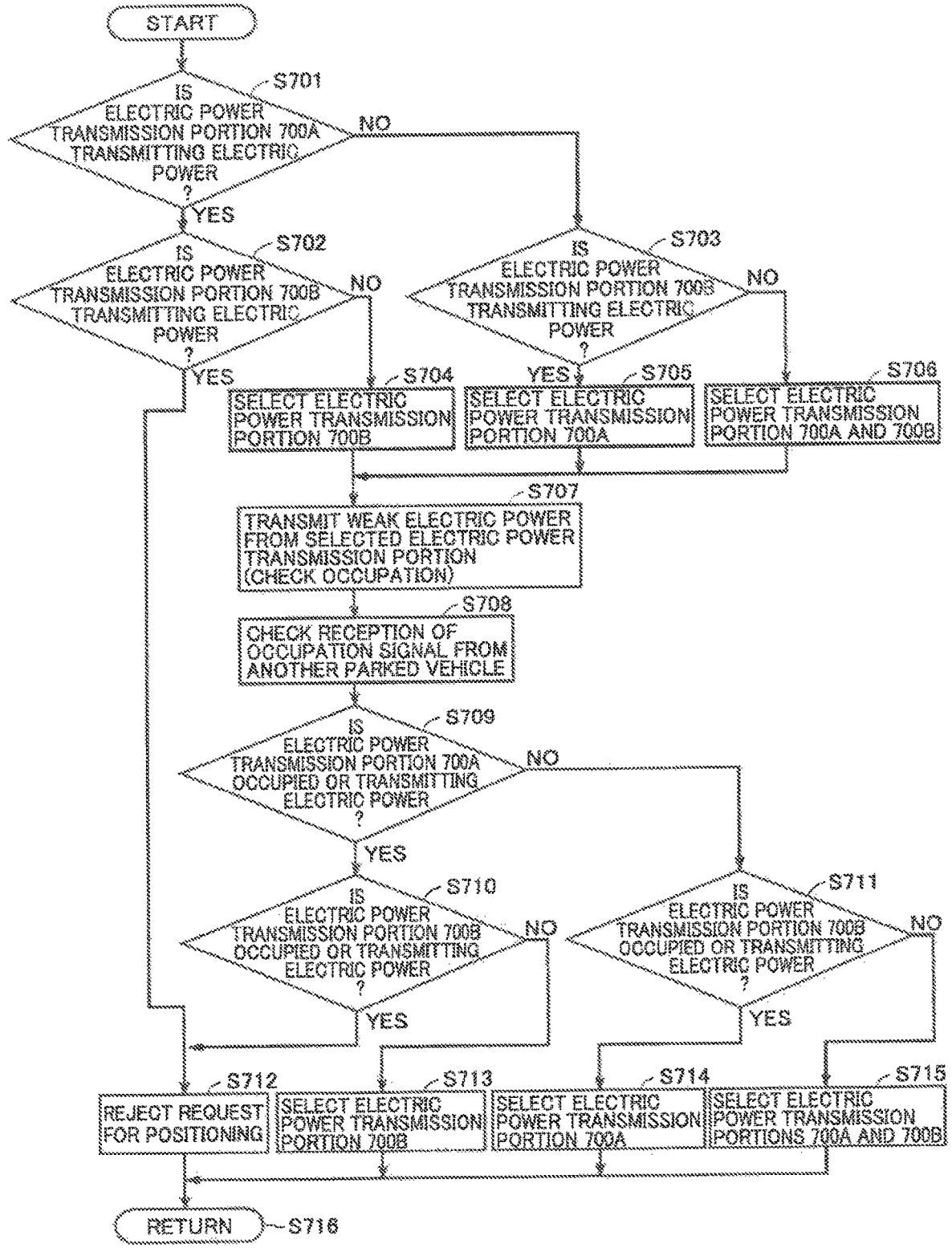
FIG. 5 is a flowchart for illustrating details of processing for selecting an electric power transmission coil performed in step S540 in FIG. 4.

FIG. 5 is a flowchart for illustrating details of processing for selecting an electric power transmission coil performed in step S540 in FIG. 4. The processing in this flowchart is performed by power supply ECU 800 of charging station 90. Referring to FIGS. 1 and 5, initially in step S701, whether or not electric power transmission portion 700A is transmitting electric power is determined. When electric power transmission portion 700A is transmitting electric power in step S701, the process proceeds to step S702, and when electric power transmission portion 700A is not transmitting electric power, the process proceeds to step S703.

Whether or not electric power transmission portion 700B is transmitting electric power is determined in step S702. When electric power transmission portion 700B is transmitting electric power in step S702, the process proceeds to step S712, and when electric power transmission portion 700B is not transmitting electric power, the process proceeds to step S704.

Whether or not electric power transmission portion 700B is transmitting electric power is determined in step S703. When electric power transmission portion 700B is transmitting electric power in step S703, the process proceeds to step S705, and when electric power transmission portion 700B is not transmitting electric power, the process proceeds to step S706.

When the process proceeds to step S704, power supply ECU 800 selects electric power transmission portion 700B as an electric power transmission candidate. When the process proceeds to step S705, power supply ECU 800 selects electric power transmission portion 700A as an electric power transmission candidate. When the process proceeds to step S706, power supply ECU 800 selects electric power transmission portions 700A and 700B as electric power transmission candidates.

When an electric power transmission candidate is determined in any of steps S704 to S706, the selected electric power transmission portion transmits weak electric power in step S707. In this transmission of weak electric power, a test signal for checking whether any electric power transmission portion is occupied by another vehicle is used. For example, as shown in FIG. 3, when vehicle 10A requests transmission of weak electric power for positioning for charging while vehicle 10B which has completed charging is occupying electric power transmission portion 700B, both of electric power transmission portions 700A and 700B transmit weak electric power.

Here, vehicle 10B can immediately receive weak electric power from electric power transmission portion 700B. Vehicle 10B corresponds to "another vehicle" in step S708. Vehicle 10B stands by in such a state that it can receive weak electric power from electric power transmission portion 700B even when charging thereof has been completed. Then, when vehicle 10B receives weak electric power from electric power transmission portion 700B, vehicle 10B transmits a signal informing that it is occupying electric power transmission portion 700B to power supply ECU 800 of charging station 90. When vehicle 10B is occupying electric power transmission portion 700A, vehicle 10B transmits a signal informing that it is occupying electric power transmission portion 700B (an occupation signal) to power supply ECU 800.

In step S708, vehicle ECU 800 checks contents of the occupation signal received from another vehicle (a vehicle other than the vehicle which has requested transmission of weak electric power for charging) which is parked.

Though an example in which a vehicle receives weak electric power and returns an occupation signal to charging station 90 has been shown in the present embodiment, charging station 90 may detect whether or not each electric power transmission portion is occupied after weak electric power is transmitted. For example, when a vehicle is present at a position where it can receive electric power, effective electric power on the transmission side increases. Therefore, effective electric power during transmission of weak electric power may be detected by a current sensor and a voltage sensor provided in each electric power transmission portion and an occupation signal of the occupied electric power transmission portion may be generated in the charging station.

In succession, whether electric power transmission portion 700A is occupied or is transmitting electric power is determined in step S709. When electric power transmission portion 700A is occupied or is transmitting electric power in step S709, the process proceeds to step S710, and when electric power transmission portion 700A is not occupied nor is transmitting electric power, the process proceeds to step S711.

Whether electric power transmission portion 700B is occupied or is transmitting electric power is determined in step S710. When electric power transmission portion 700B is occupied or is transmitting electric power in step S710, the process proceeds to step S712, and when electric power transmission portion 700B is not occupied nor is transmitting electric power, the process proceeds to step S713.

Whether electric power transmission portion 700B is occupied or is transmitting electric power is determined in step S711. When electric power transmission portion 700B is occupied or is transmitting electric power in step S711, the process proceeds to step S714, and when electric power transmission portion 700B is not occupied nor is transmitting electric power, the process proceeds to step S715.

Through the selection processing above, the processing is allocated to any of steps S712 to S715. When the process proceeds to step S712, every electric power transmission portion is transmitting electric power or is occupied, and hence a request for positioning from a vehicle which has newly come to charging station 90 is rejected. When the process proceeds to step S713, electric power transmission portion 700B is selected as a subject of transmission of weak electric power for positioning. When the process proceeds to step S714, electric power transmission portion 700A is selected as a subject of transmission of weak electric power for positioning. When the process proceeds to step S715, electric power transmission portions 700A and 700B are selected as subjects of transmission of weak electric power for positioning.

When processing in any of steps S712 to S715 is completed, the process proceeds to step S716 and control returns to the flowchart in FIG. 4.

Figure 6:
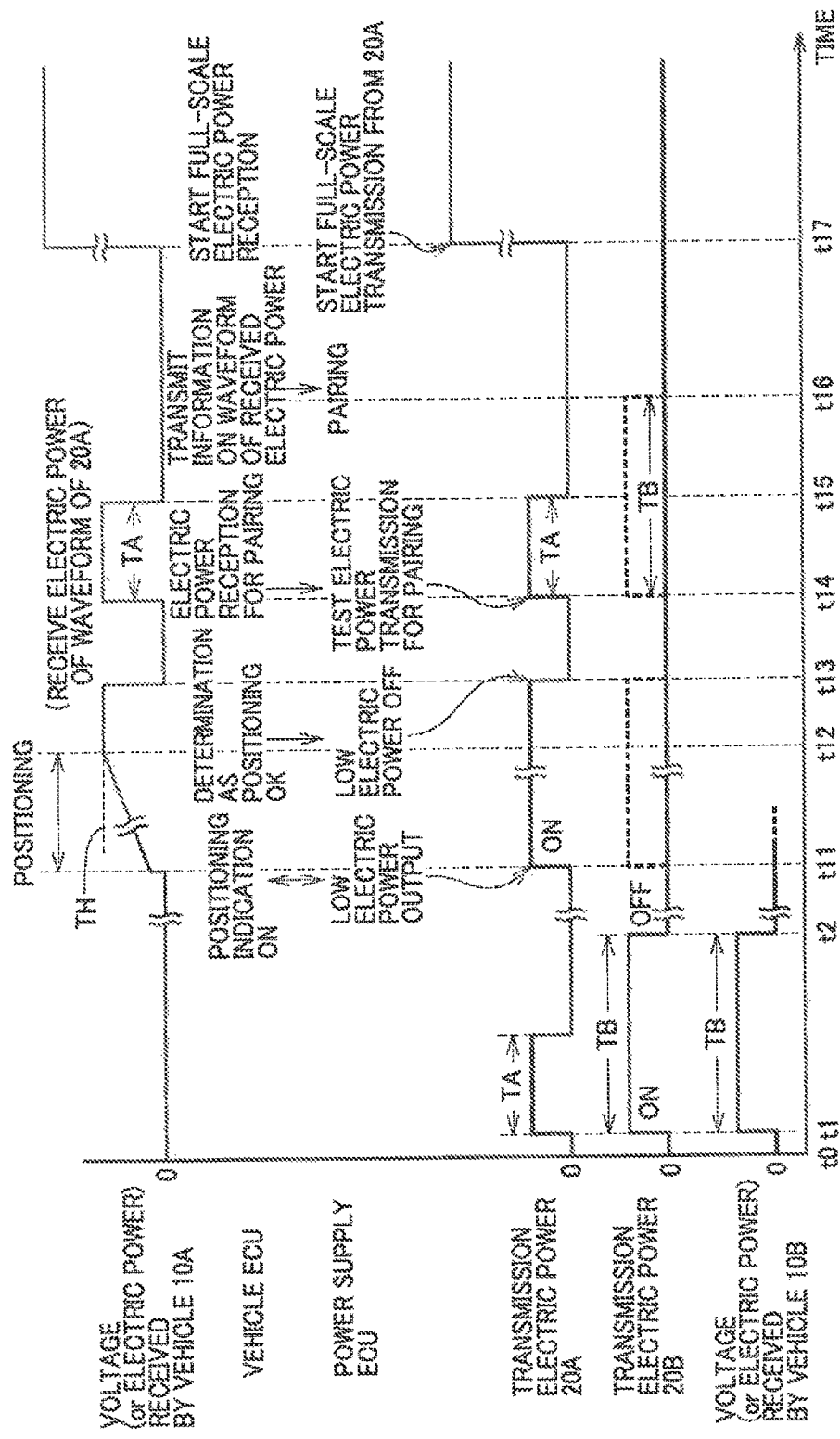
FIG. 6 is a timing chart representing variation in transmission electric power and a received voltage which are varied during the course of the processing in FIGS. 4 and 5.

FIG. 6 is a timing chart representing variation in transmission electric power and a received voltage which are varied during the course of the processing in FIGS. 4 and 5.

FIG. 6 shows an operation waveform in a case that vehicle 10A has requested transmission of weak electric power for positioning while vehicle 10B is occupying electric power transmission portion 700B after completion of charging (while electric power transmission portion 700B is not transmitting electric power) as exemplified in FIG. 3.

In response to a request for transmission of weak electric power from vehicle 10A (step S30 in FIG. 4), at time t1, weak electric power is transmitted from electric power transmission portion 700A of electric power transmission device 20A and electric power transmission portion 700B of electric power transmission device 20B.

Figure 7:
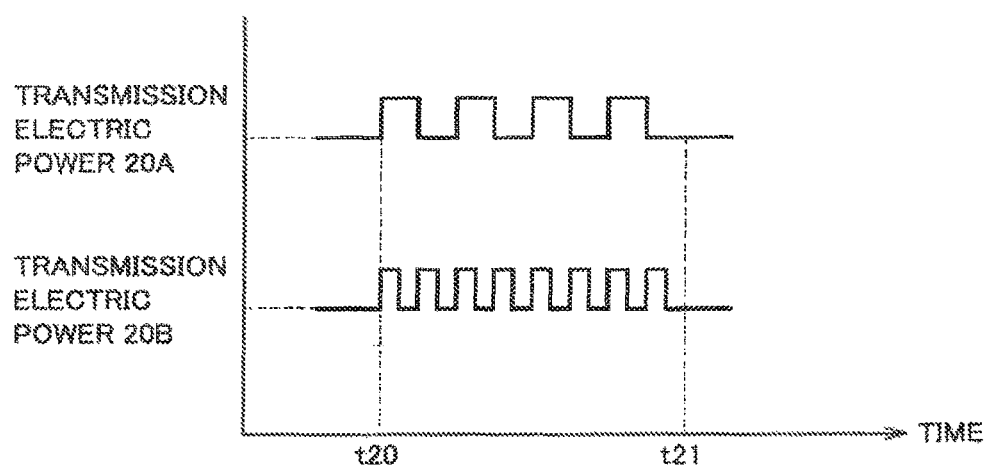
FIG. 7 is a diagram for illustrating a modification of occupation checking processing or pairing processing.

Preferably, weak electric power here is transmitted with electric power characteristics being different for each electric power transmission portion. Differing electric power characteristics for each electric power transmission portion is exemplified by differing a time period for supply of transmission electric power, such as a time period for supply TA from electric power transmission portion 700A and a time period for supply TB from electric power transmission portion 700B. Another example of differing electric power characteristics for each electric power transmission portion may be electric power transmission with the number of times of on and off being differed for each electric power transmission portion as shown in FIG. 7.

In the example shown in FIG. 6, from time t1 to t2, vehicle 10B receives weak electric power for time period of supply TB from electric power transmission portion 700B. When vehicle 10B returns a signal indicating time period for supply TB to the charging station, the charging station recognizes that electric power transmission portion 700B corresponding to time period for supply TB is occupied. Vehicle 10B may recognize that electric power is transmitted from electric power transmission portion 700B and return a signal indicating occupation of electric power transmission portion 700B.

From time t11, electric power transmission portion 700B is excluded from electric power transmission portions to which vehicle 10A can be guided, and positioning with electric power transmission portion 700A is carried out.

Referring again to FIG. 4, when the processing for selecting a coil in step S540 is completed, charging station 90 transmits in step S550, weak electric power for positioning between an electric power transmission device including the selected electric power transmission portion and electric power reception device 120. In the waveform example in FIG. 6, since electric power transmission device 20B is occupied by vehicle 10B which has arrived earlier, weak electric power is transmitted only from electric power transmission device 20A.

In step S50, vehicle 10A carries out positioning through automatic or manual movement of vehicle 10A (see a time point t11 in FIG. 6). During positioning, vehicle ECU 500 renders relay 202 conductive and obtains magnitude of received voltage VR which is produced across the opposing ends of resistor 201 and detected by voltage sensor 203. Since this voltage is lower than a voltage in full-scale electric power transmission, vehicle ECU 500 sets relay 210 to off so as not to be affected by power storage device 300 during detection.

In the vehicle, vehicle ECU 500 notifies in step S60 the fact that magnitude of received voltage VR has exceeded a threshold value TH through display portion 520. The user thus recognizes that positioning has been successful. Thereafter, when the user gives a notification that the parking position is OK by pressing a parking switch within vehicle 10A, the process proceeds to step S70 (see a time point t12 in FIG. 6).

In step S70, vehicle ECU 500 transmits a request for stopping transmission of weak electric power for positioning to charging station 90. In step S570, power supply ECU 800 of charging station 90 receives the request for stopping transmission of weak electric power, and transmission of weak electric power for positioning by electric power transmission devices 20A and 20B ends (see a time point t13 in FIG. 6).

In step S80 and step S580, vehicle ECU 500 and power supply ECU 800 perform pairing processing for checking whether or not positioning with any of electric power transmission devices 20A and 20B has reliably been achieved.

As shown with time from t14 to t15 in FIG. 6, when electric power transmission device 20A is selected as a subject of electric power transmission in step S540, power supply ECU 800 allows test electric power transmission for pairing from electric power transmission portion 700A of electric power transmission device 20A.

In contrast, when electric power transmission device 20B is selected as a subject of electric power transmission in step S540, power supply ECU 800 allows test electric power transmission for pairing from electric power transmission portion 700B of electric power transmission device 20B.

In test electric power transmission used in the pairing processing, as in positioning, output to such an extent as being used in what is called a specified low power radio station (equal to or lower than 1/100 of full-scale electric power transmission used for charging) is preferred.

In FIG. 6, power supply ECU 800 differs a duration of on of transmission electric power for each electric power transmission device. Namely, in transmission of electric power by electric power transmission device 20A, electric power transmission is carried out with transmission electric power being turned on for a time period of TA (see a time point t14 in FIG. 6). When vehicle 10B has not occupied electric power transmission device 20B, as shown with a dashed line, electric power transmission device 20B also transmits electric power with transmission electric power being turned on for time period of TB (see time points t14 to t16 in FIG. 6).

In steps S90 and S100, vehicle ECU 500 counts the duration of on of received electric power, and in step S110, notifies power supply ECU 800 of the counted duration of on. In the example in FIG. 6, electric power reception device 120 receives transmission electric power from electric power transmission device 20A. Vehicle ECU 500 notifies power supply ECU 800 of the fact that the duration of on of received electric power is TA. Power supply ECU 800 can thus reliably confirm positioning of vehicle 10A with electric power transmission device 20A.

In step S620, charging station 90 performs processing for full-scale electric power transmission from the electric power transmission device which is in positioning and has completed checking that a subject has been determined through pairing (see a time point t17 in FIG. 6). In the example in FIG. 6, electric power transmission device 20A performs processing for electric power transmission. In step S120, vehicle 10A performs processing for full-scale electric power reception by electric power reception device 120 and power storage device 300 is charged with received electric power. Then, when charging of power storage device 300 is completed, processing on the vehicle side and in the charging station ends.

An example in which electric power transmission with characteristics of weak electric power being differed for each electric power transmission portion is carried out from t1 to t2 in FIG. 6 has been shown. Without electric power transmission with characteristics of weak electric power being differed for each electric power transmission portion, if vehicle 10B holds, also after end of charging, information at the time when pairing of vehicle 10B is carried out before charging to determine an electric power transmission portion, information allowing determination of an electric power transmission portion may be returned to charging station 90 in response to transmission of the same weak electric power by all electric power transmission portions or reception of communication from communication portion 810.

(Modification of Occupation Checking Processing and Pairing)

FIG. 7 is a diagram for illustrating a modification of occupation checking processing or pairing processing. In FIG. 7, power supply ECU 800 differs a cycle of switching between on and off of transmission electric power for each electric power transmission device. Namely, electric power transmission device 20A switches between on and off of transmission electric power every cycle ΔTA and electric power transmission device 20B switches between on and off of transmission electric power every cycle ΔTB.

Vehicle ECU 500 notifies power supply ECU 800 of the number of times of switching between on and off of received electric power. In the example in FIG. 7, vehicle ECU 500 counts the number of times of occurrence of switching between on and off from time t20 to t21 and notifies power supply ECU 800 of the count. Power supply ECU 800 thus knows which electric power transmission device is occupied by the vehicle or with which electric power transmission device the vehicle is in positioning.

In the modification in FIG. 7, processing for checking occupation or pairing is achieved with the use of transmission electric power, however, limitation thereto is not intended. Pairing can be achieved with various techniques, and for example, pairing may be achieved by providing a radio frequency identification (RFID) tag and an RFID reader in a vehicle and an electric power transmission portion, respectively, based on an RFID technique.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-contact electric power transmission system, comprising:
   a vehicle; and
   a charging station,
   the charging station comprising;
      an electric power transmission portion configured to transmit electric power to the vehicle in a non-contact manner; and
      an electric power transmission control unit configured to control electric power transmission from the electric power transmission portion,
   the electric power transmission control unit being configured to control the electric power transmission portion to support positioning of the vehicle, when the electric power transmission control unit receives a first signal for positioning,
   the vehicle being configured to:
      perform positioning to align with the electric power transmission portion based on support services from the electric power transmission portion; and
      send a notification to the charging station when the vehicle completes positioning to align with the electric power transmission portion,
   the charging station being configured to:
      stop the supporting for positioning from the electric power transmission portion; and
      after stopping the supporting for positioning, transmitting a signal including an ID of the electric power transmission portion for pairing, the ID being received from the electric power transmission portion,
   the vehicle being configured to send the ID to the charging station, and
   the charging station being configured to confirm complete pairing, based on the ID sent from the vehicle.

\* \* \* \* \*